United States Patent

[11] 3,555,302

| [72] | Inventor | Joe A. Nuckolls<br>Hendersonville, N.C. |
|---|---|---|
| [21] | Appl. No. | 687,041 |
| [22] | Filed | Nov. 30, 1967 |
| [45] | Patented | Jan. 12, 1971 |
| [73] | Assignee | General Electric Company<br>a corporation of New York |

[54] HIGH-FREQUENCY CONTROL CIRCUIT
16 Claims, 5 Drawing Figs.

| [52] | U.S. Cl. | 307/252, 307/240, 307/305, 315/240, 315/340, 307/324 |
|---|---|---|
| [51] | Int. Cl. | H03k 17/00 |
| [50] | Field of Search | 307/252, 240, 305; 315/340, 240 |

[56] References Cited
UNITED STATES PATENTS

| 3,025,418 | 3/1962 | Brahm | 307/252X |
|---|---|---|---|
| 3,214,604 | 10/1965 | Morgan | 307/252 |
| 3,283,177 | 11/1966 | Cooper | 307/252X |
| 3,344,311 | 9/1967 | Nuckolls | 307/252X |
| 3,353,032 | 11/1967 | Morgan et al. | 307/252 |
| 3,422,309 | 1/1969 | Spira et al. | 307/252X |
| 3,453,450 | 7/1969 | Evalds | 307/252X |

Primary Examiner—Donald D. Forrer
Assistant Examiner—John Zazworsky
Attorneys—Gilbert P. Tarleton, Sidney Greenberg, Melvin M. Goldenberg, Frank L. Neuhauser and Oscar B. Waddell ABSTRACT: High-frequency control circuit operating gaseous discharge lamps from an alternating current source includes an alternating current wave-chopping circuit comprising parallel connected oppositely poled controlled rectifiers actuated by a voltage sensitive switch connected to an RC charging circuit, and a commutating branch connected across the controlled rectifiers comprising a capacitor and an inductor in series.

Inventor,
Joe A. Nuckolls,
by Sidney Greenberg
His Attorney.

Inventor,
Joe H. Nuckolls,
by Sidney Greenberg
His Attorney.

HIGH-FREQUENCY CONTROL CIRCUIT

It is an object of the present invention to provide an improved electrical circuit for starting, operating and controlling load devices, especially gaseous discharge lamps.

It is a particular object of the invention to provide an electrical circuit of the above type which provides high-frequency current pulses of controlled duration and frequency for starting and operating gaseous discharge lamps.

Still another object of the invention is to provide an electrical circuit of the above type which is characterized by low losses, broad control range, high line power factor, and low energy storage requirements, and which is compact in form and is of relatively low cost.

Other objects and advantages will become apparent from the following description and the appended claims.

With the above objects in view, the present invention relates to a high-frequency control circuit comprising, in combination, a source of alternating current, load means connected to and energized by the alternating current source, and alternating current wave-chopping means for energizing the load means with high-frequency alternating current pulses in a controlled manner for starting and controlling the operation of the load means.

In a typical arrangement of the described circuit, the load means comprises a gaseous discharge lamp in series with a current limiting impedance, and the wave-chopping means comprises controlled rectifier switching means in combination with an RC triggering means and a pulse duration control means for producing high-frequency pulses of controlled reoccurrence rate and duration.

The invention will be better understood from the following description taken in conjunction with the accompanying drawings, in which.

Figure 1:
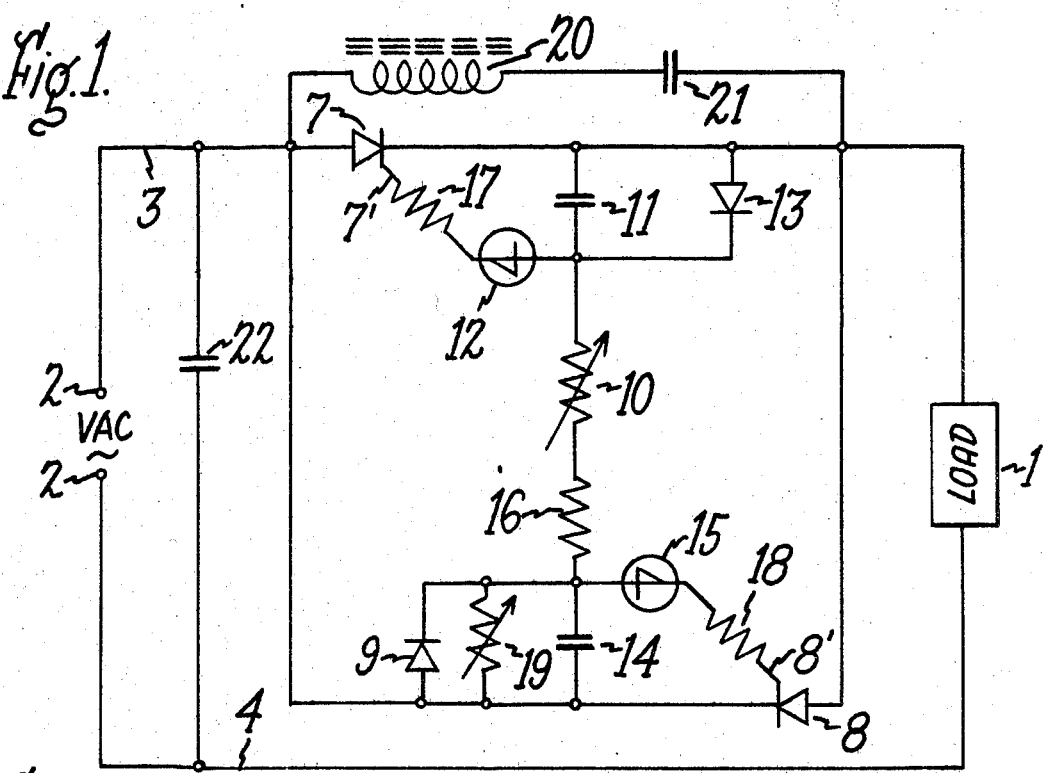
FIG. 1 is a circuit diagram of an embodiment of the high-frequency control circuit constructed in accordance with the invention.

Referring now to the drawings, and particularly to FIG. 1, there is shown a load means 1 which may typically be a gaseous discharge lamp, such as a mercury vapor or other metal vapor lamp, usually associated with suitable current limiting or ballasting means and maximum load impedance means, and which is connected by line conductors 3 and 4 to terminals 2 of a source of alternating current, e.g., 110 or 220 volts. A switching circuit connected in series with load 1 comprises paralleled oppositely poled controlled rectifiers 7 and 8, which are typically silicon controlled rectifiers (SCR) having control (gate) electrodes 7' and 8' by means of which the SCR's are rendered conductive for unidirectional flow of current when a signal (trigger) impulse is applied to the respective control electrodes.

A signal generating circuit is provided for triggering the respective SCR's in turn on alternate half cycles. This circuit includes diode 9 connected to line conductor 3 in series with variable resistance 10 and charging capacitor 11. Voltage sensitive switch 12, such as the Shockley diode shown or a neon glow lamp, is connected across capacitor 11 in series with control electrode 7' of SCR 7 so as to form a series discharge loop with capacitor 11 and electrode 7' for triggering SCR 7. Diode 13 is also connected to the supply line 3 in series with variable resistor 10, and charging capacitor 14 is similarly connected in a discharge loop with Shockley diode 15 and control electrode 8' of SCR 8 for triggering the latter.

Resistor 16 in series with variable resistor 10 serves to provide a minimum charging resistance in this branch if desired. Resistors 17 and 18 in the control electrode circuits serve to limit the peak gate currents in these circuits. Resistors 16, 17 and 18 are not always necessary and may be dispensed with in appropriate circumstances.

To ensure symmetrical pulsing, i.e., an equal number of pulses in both half cycles, capacitor 14 can be selected to be slightly smaller in magnitude than capacitor 11, and variable resistor 19 may be arranged in shunt with capacitor 14 and adjusted to compensate for different gating characteristics of SCR's 7 and 8 or different breakdown characteristics of Shockley diodes 12 and 15. It will be understood that other types of variable impedance devices such as a capacitor or inductor may be used in place of variable resistor 19.

The alternating current wave-chopping arrangement shown in FIG. 1 further comprises a series-connected LC branch placed across the SCR switching network for effecting the desired commutating function and chopping the incoming sine wave into pulses of desired duration. This branch comprises inductance 20 and capacitor 21 connected in series, and upon triggering of the SCR forms a high Q resonant circuit which, on reverse voltage ring-back, serves to turn off the SCR which had been triggered into conduction. The impedance level of this LC commutating branch should be low enough to ensure commutation at the lowest instantaneous surge voltage at which the SCR is fired and peak load current encountered. Further, the load impedance level should be at least a minimum amount to ensure commutation. The duration of the pulses produced by the described circuit can be adjusted by appropriate selection of the magnitudes of inductance 20 and capacitor 21. In an illustrative arrangement for example, using a 120 volt alternating current source, inductance 20 will be 150 microhenries, capacitor 21 will be 0.25 microfarads, and the load impedance will be 25—30 ohms.

Filter capacitor 22 connected across the supply terminals 2 provides a stiff source of high-frequency energy for the pulses generated by the wave-chopping circuit.

In the operation of the described arrangement, assuming that the source voltage is instantaneously positive in line conductor 3 and with SCR 7 deenergized, current flows from conductor 3 through diode 9, and resistors 16 and 10 to force a voltage buildup on charging capacitor 11. This voltage buildup is delayed by the RC charging time constant, and as will be understood, this is controllable by varying the magnitude of resistor 10. When the charge on capacitor 11 reaches the voltage breakdown level of Shockley diode 12, the latter becomes conductive and the capacitor discharges through it to apply a pulse on control electrode 7', thereby triggering SCR 7 into conduction for transmitting power to the load from the alternating current source. At the same time, the resonant commutating circuit comprising inductance 20 and capacitor 21 comes into operation and turns off SCR 7 after a predetermined period for producing a pulse of predetermined duration, as described previously. This SCR 7 is then again turned on during the same half cycle by repeated buildup of the charge on capacitor 11 and turned off by action of the described LC resonant branch, and this process is repeated to produce pulses at a high frequency. On the next half cycle, SCR 8 is repeatedly energized through diode 13 and resistors 10 and 16 and by the operation of charging capacitor 14 and Shockley diode 15 in the manner as described in connection with SCR 7, and SCR 8 is repeatedly deenergized by the commutating circuit of inductor 20 and capacitor 21 in a manner like that already described. The alternating current sine wave is thus chopped into energy pulses of controlled period and reoccurrence frequency for application to the load for starting and operating it.

Figure 2:
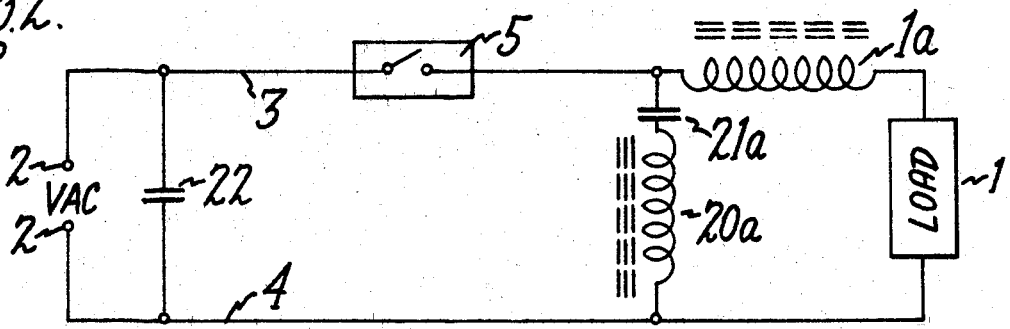
FIG. 2 is a circuit diagram showing a modification of the FIG. 1 arrangement.

FIG. 2 shows a modification of the FIG. 1 arrangement wherein the commutating LC branch comprising inductance 20a and capacitor 21a is connected across the load circuit (shown as comprising load 1 and ballast reactor 1a), rather than across the SCR switching circuit as shown in FIG. 1. This arrangement has the advantage of providing complete isolation of the load and source when switch means 5 is open. Switch means 5 may be the paralleled SCR arrangement as shown in FIG. 1, or it may comprise a symmetrical semiconductor alternating high-frequency current switch having a single control electrode e.g., a device known as a "triac." Although not shown in FIG. 2, it will be understood that a triggering circuit such as shown in FIG. 1 may be incorporated therein for controlled triggering of switch 5, or other triggering circuits, e.g., such as shown in FIGS. 3 and 4 may be employed.

While the load may typically be a gaseous discharge lamp, it will be understood that other load devices may be used. For example, the load may comprise a high-frequency transformer (not shown) for providing voltage transformation in the high-frequency pulse mode. In such case, the high-frequency transformer would be connected across either capacitor 21a or across both capacitor 21a and inductor 20a, since it is desired to deliver the energy on the capacitor to the load.

Figure 3:
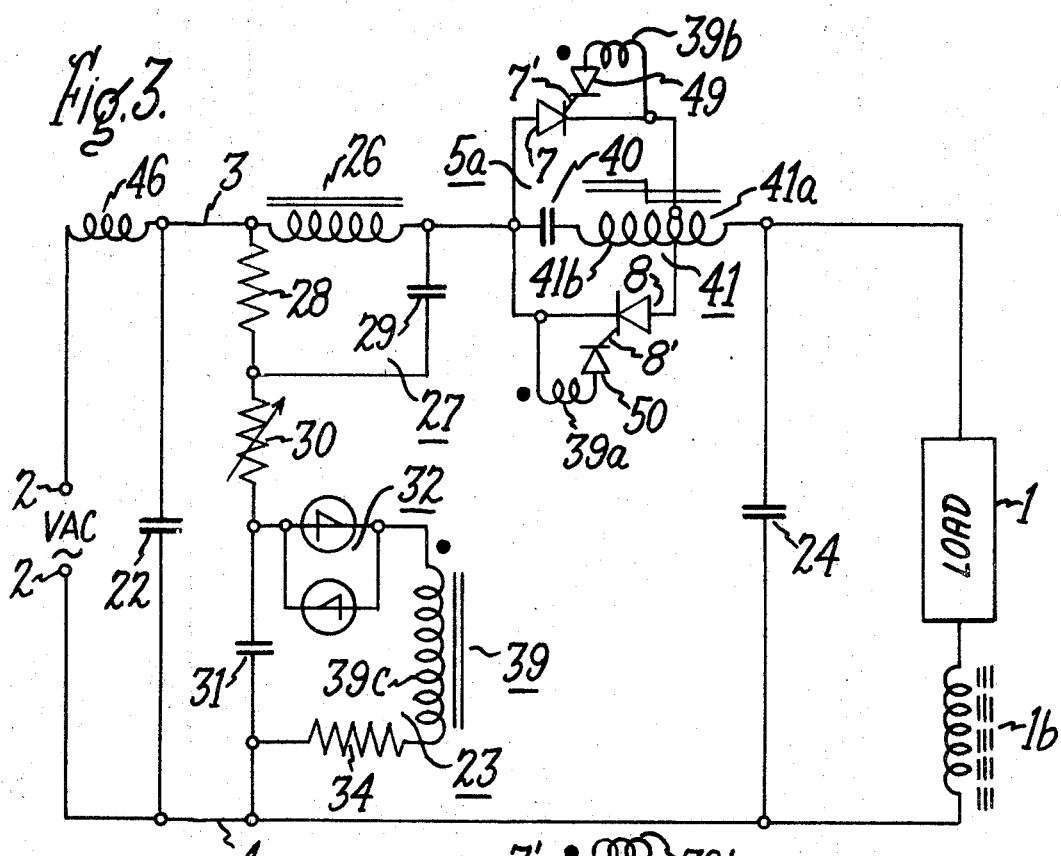
FIG. 3 is a circuit diagram showing another embodiment of the invention incorporating a different form of triggering means.
Figure 4:
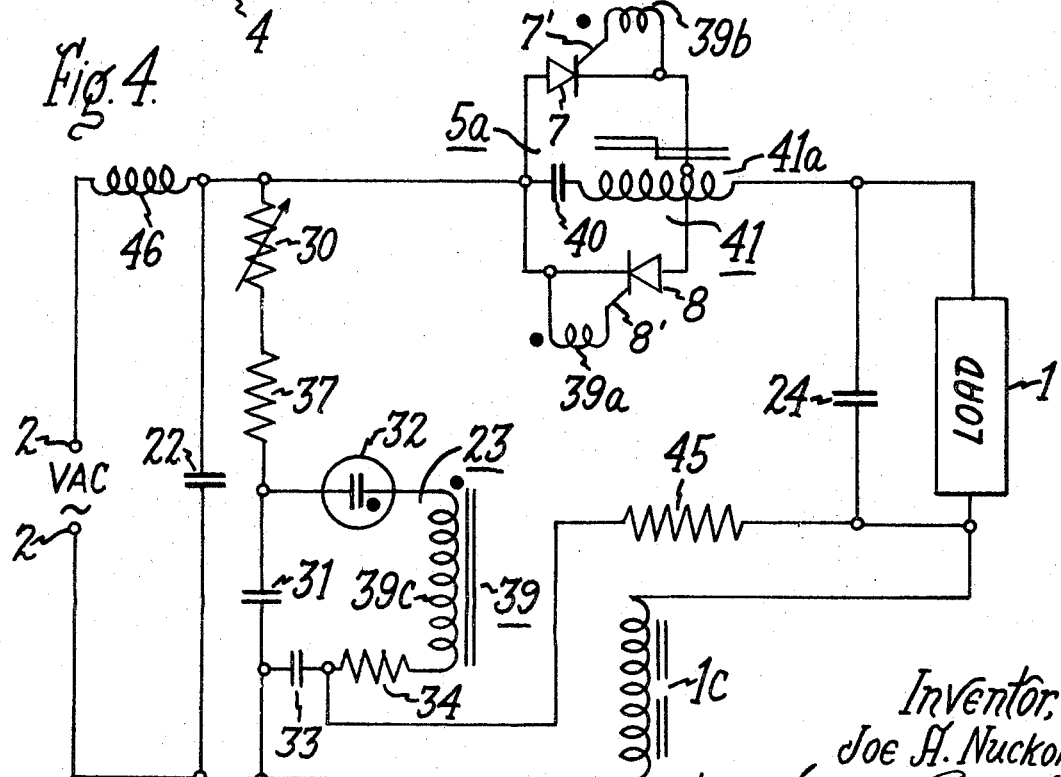
FIG. 4 is a circuit diagram showing a modification of the FIG. 3 arrangement.

FIG. 3 shows another embodiment of the invention in which a different type of commutating circuit is incorporated and which illustrates another form of triggering circuit. This embodiment also includes a high frequency slaving network 27 comprising resistor 28 and capacitor 29 connected across reactor 26 arranged in series with lamp load 1. Slaving network 27 serves to synchronize the trigger circuit to the high-frequency current and to stabilize the load current and may force current symmetry, and is also described in U.S. Pat. No. 3,344,311 - Nuckolls, assigned to the same assignee as the present invention, the description of which patent is incorporated by reference herein. The triggering (actuating) circuit 23, which is connected to the supply voltage through slaving network 27, comprises variable resistance 30 in series with charging capacitor 31, and a discharge loop for discharging capacitor 31, including the primary of transformer 39 and a voltage sensitive symmetrical switch 32, such as the parallel oppositely poled Shockley diode arrangement shown, or equivalent device. The actuating circuit may also include dampening resistor 34 arranged as shown. Control electrodes 7' and 8' of SCR 7 and 8 are respectively connected to secondary windings 39b, 39a of coupling transformer 39 and are actuated by pulses transmitted to transformer 39 by operation of triggering circuit 23, so as to alternately turn on the respective SCR's on succeeding half cycles. The structure and operation of this triggering and switching arrangement are more fully disclosed in the aforementioned Nuckolls patent, and the description of this feature in the latter patent is incorporated herein by reference. As there described, on each half cycle of the alternating current input, one of the controlled rectifiers 7 and 8 will have a positive anode and the other a positive cathode. Therefore, a control signal applied to control electrodes 7' and 8' will place only one of the controlled rectifiers in a conduction mode on each half cycle. Small diodes 49, 50 may be connected as shown in each control electrode loop polarizing the electrodes so that only the positive anode biased SCR receives a pulse. A delay in the point in the alternating current input cycle at which the control signal trigger pulse is applied to render the rectifier conductive is known as phase control. When voltage sensitive switch 32 becomes conductive as a result of voltage buildup on capacitor 31, capacitor 31 discharges, and a pulse is applied to the transformer primary 39c which induces a current pulse of a particular duration and at a particular time in the half cycle. The controlled rectifier 7 or 8 which has an anode positive with respect to its cathode will then be triggered by the pulse current applied to the appropriate control electrode 7' or 8', and the voltage which has built up across the rectifier falls substantially to zero. The controlled rectifier 7 or 8 then permits current to flow building up the voltage, and consequently the power, applied to the load, until the source voltage again falls to zero at half cycle. On the next half cycle as the anode voltage becomes negative, the controlled rectifier 7 or 8 which was conductive becomes nonconductive and no power is transferred to the load until the signal generating circuit fires the other controlled rectifier. The time in the half cycle in which the rectifier is gated is adjustable by the level of resistance 30.

By virtue of the described arrangement, trigger circuit 23 is rigorously slaved to both the input sine wave voltage supply and the high frequency state of the switching and commutating circuits. The commutating branch in the FIG. 3 embodiment comprises capacitor 40 and a saturable current transformer 41 connected in series across SCR switching circuit 5a. SCR's 7 and 8 are connected to a tap on transformer 41, which thus constitutes an auto transformer having primary winding 41a on the load side and secondary winding 41b adjacent capacitor 40. Capacitor 24 connected across load 1 has a relatively low capacitance, providing a maximum load impedance and affording a path for holding current for the SCR's prior to lamp ignition and drawing of load current. Inductances 26 and 1b in series with lamp load 1 serve to limit lamp current during the power pulse interval, and inductance 1b also limits the peak current delivered by capacitor 24 during lamp breakdown at each pulsing.

The operation of this circuit is as follows. Assuming positive voltage on line conductor 3, triggering circuit 23 applies a trigger pulse to SCR 7, thus turning the latter on, whereby current is conducted through SCR 7 into the tap of transformer 41 and through primary winding 41a to the load circuit. During this time transformer 41 is a linear device which supplies current to the load side of capacitor 40 as adjusted by the turns ratio of the transformer. A voltage buildup thus occurs during this half cycle across capacitor 40, which is positive on the load side. After a predetermined volt-time interval during this half cycle, transformer 41 is driven into saturation, and its impedance collapses to a low level, thus effectively placing the charged capacitor 40 directly across turned-on SCR 7. The voltage drop across the latter being relatively low, e.g., 1½ volts, whereas the voltage on capacitor 40 is substantially higher, e.g., 20 volts, capacitor 40 forces a reverse current and voltage to appear on SCR 7 for a period of time sufficient to force its turnoff (commutation). SCR 7 is now deenergized and remains nonconductive until retriggered by triggering circuit 23. This process is repeated many times within the positive half cycle in which this SCR is forward biased. On the next half cycle, the described repetitive switching function is transferred to the other SCR 8 for chopping the incoming sine wave.

During the SCR turn-on, inductance 26 and capacitor 24 comprise a high Q series resonant oscillating circuit effecting ring-up with a high voltage appearing across capacitor 24, thus forcing rapid lamp ionization and ignition. Capacitor 24 may, if desired, be shunted or replaced by a resistor for providing the maximum load impedance presented to the switching circuit.

It will be understood that the commutating branch shown in FIG. 3 may be used in the FIG. 1 circuit in place of the corresponding LC branch shown there.

FIG. 4 shows a modification of the FIG. 3 circuit which incorporates a high frequency synchronization feedback into the trigger circuit to slave the trigger circuit operation to the actual instantaneous switching condition, thereby providing correct timing for the trigger circuit output. In this circuit, resistor 45 is connected to the load circuit at the output of the switching circuit and to trigger circuit 23 in series with auxiliary capacitor 33. This arrangement provides for charging of capacitor 33 in such manner as to oppose the normal charging voltage and resultant breakdown of the voltage sensitive switch 32, so as to disable the trigger circuit 23 during the power pulse interval to prevent nonsynchronized triggering of the SCR's.

The FIG. 4 arrangement is only one example of the provision of a feedback path from the load side of the SCR's to supply electrical intelligence back into the trigger circuit to synchronize the output of the latter to the high frequency switching operation, while still operating the circuit from the source voltage. As will be understood, the point of pickup of this switching status information and the point of insertion into the trigger circuit can be varied from that shown while still providing desired results.

Various other types of feedback arrangements may be incorporated in the described circuits for providing desired starting, operating, stabilizing, regulating and other functions as disclosed, for example, in the aforementioned Nuckolls patent.

Coil 46 shown inserted in the supply line in FIGS. 3 and 4 serves as a radio frequency choke to limit noise generated by operation of the disclosed circuits which may appear in the supply circuit.

Fixed resistor 37 shown in FIG. 4 in series with variable resistor 30 provides a minimum residual resistance in this circuit.

Voltage sensitive switch 32a shown in the FIG. 4 actuating circuit is illustrated in this case as a neon glow tube, although other forms of such switches may be used instead.

Figure 5:
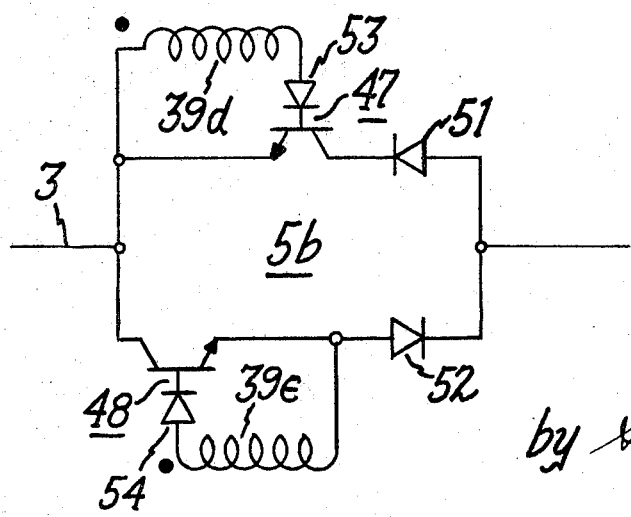
FIG. 5 is a circuit diagram showing a different form of switching means.

FIG. 5 shows another form of switching means which may be used in place of the controlled rectifier switching circuit and commutating branch shown in FIGS. 3 and 4. In this embodiment, power switching transistors are employed in circuit 5b for providing the switching and commutating functions and load power control. As shown, transistors 47 and 48 are connected in supply conductor 3 in parallel oppositely poled relation and with secondary windings 39d and 39e of coupling transformer 39c (see FIG. 3) being connected, respectively, in series with the bases of the transistors. Small diodes 53,54, corresponding in function to diodes 49,50 in FIG. 3, may also be connected in series with each transistor base to ensure that only the forward biased transistor receives a signal pulse from the actuating circuit. The latter may be the actuating circuit 23 shown in FIG. 23 and operate to apply a signal pulse to the respective transistors through the secondaries 39d and 39e, or other types of triggering or actuating circuits suitable for use with power transistors may be employed for this purpose. Diodes 51 and 52 connected in oppositely poled arrangement in the transistor circuits serve to prevent reverse voltages from appearing on the respective transistors.

The FIG. 5 switching circuit, which may be used, for example, in place of switching circuit 5a and associated commutating branch shown in FIGS. 3 and 4, has the advantage that the transistors do not have to be commutated or turned off by separate energy storing circuit components as in the previously described circuits. When the base driving current is rapidly removed, the transistor ceases to conduct and remains nonconductive until a driving (trigger) pulse is reapplied to the base. Thus, the "on" time and the duty cycle can be controlled through the trigger (actuating) circuit. The transistor switching circuit, accordingly, provides another effective alternating current, high-frequency wave-chopping means for controlling lamp and other load devices. As will be understood, feedback circuits of the types and for the purposes previously mentioned may also be incorporated in circuits embodying the transistor switching arrangement.

There are thus provided by the invention novel circuit arrangements which serve to chop alternating current sine waves into high-frequency components that are readily controlled, and which are characterized by very low losses, broad control range, high line power factor, and low energy storage requirements for the supporting circuitry components, e.g., the ballast component. The invention may be applied for operating loads other than lighting devices, as for example induction heaters, welding apparatus, speed controlled motors, etc.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

I claim:

1. High-frequency control circuit comprising, in combination, a source of alternating current, load means connected to and energized by said alternating current source, and alternating current wave-chopping means for energizing in a controlled manner said load means with high-frequency alternating current pulses following said source of alternating current for starting and controlling the operation of said load means, said wave-chopping means comprising controlled switching means, actuating means connected to said switching means for controlling the operation thereof for producing high-frequency pulses at a predetermined rate, and commutating means connected to said switching means for controlling the duration of said pulses.

2. A circuit as defined in claim 1, wherein said commutating means comprises a capacitor and an inductor connected in series.

3. A circuit as defined in claim 2, wherein said commutating means is connected across said controlled switching means.

4. A circuit as defined in claim 2, wherein said commutating means is connected across said load means at the output side of said controlled switching means.

5. A circuit as defined in claim 1, wherein said actuating means comprises resistance means and capacitance means connected in series and voltage sensitive switch means connected in series discharge relation with said capacitance means, said controlled switching means comprising controlled rectifier means having control electrode means for triggering the operation thereof, said control electrode means being connected to said actuating means for actuation thereby.

6. A circuit as defined in claim 5, said controlled rectifier means comprising parallel connected oppositely poled controlled rectifiers each having a control electrode, said capacitance means comprising a pair of capacitors respectively connected between said resistance means and the respective controlled rectifiers, said voltage sensitive switch means comprising a pair of unidirectional semiconductor switches respectively connected between said capacitors and said control electrodes.

7. A circuit as defined in claim 6, and diode means connected between said current source and said actuating means for passing current alternately to said respective control electrodes on alternate half cycles.

8. A circuit as defined in claim 6, wherein a variable resistor is connected across one of said pair of capacitors.

9. A circuit as defined in claim 2, wherein a high-frequency capacitor is connected across said alternating current source at the input side of said wave-chopping means.

10. A circuit as defined in claim 3, said inductor of said commutating means comprising a saturable transformer, said controlled switching means being connected to a tap on said saturable transformer forming an auto transformer having a primary connected to said load means and a secondary connected to said capacitor.

11. A circuit as defined in claim 10, said controlled switching means comprising parallel connected oppositely poled controlled rectifiers each connected to said tap.

12. A circuit as defined in claim 1, and feedback means connected between the output side of said controlled switching means and said actuating means for synchronizing the output of said controlled switching means with the operation of said actuating means.

13. A circuit as defined in claim 1, wherein said controlled switching means comprises transistor means connected between said alternating current source and said load means.

14. A circuit as defined in claim 1, wherein said controlled switching means comprises parallel connected, oppositely poled transistors connected between said alternating current source and said load means.

15. A circuit as defined in claim 1, wherein said controlled switching means comprises a pair of parallel connected, oppositely poled, unidirectional semiconductor switches.

16. A circuit as defined in claim 15, including unidirectional blocking means connected between each semiconductor switch and said actuating means for directing trigger pulses from said latter means to the respective semiconductor switches.